United States Patent
Leung et al.

(10) Patent No.: US 7,227,863 B1
(45) Date of Patent: *Jun. 5, 2007

(54) METHODS AND APPARATUS FOR IMPLEMENTING HOME AGENT REDUNDANCY

(75) Inventors: Kent K. Leung, Mountain View, CA (US); Madhavi W. Chandra, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 1090 days.

This patent is subject to a terminal disclaimer.

(21) Appl. No.: 10/008,494

(22) Filed: Nov. 9, 2001

(51) Int. Cl.
*H04L 12/28* (2006.01)
*H04L 12/56* (2006.01)

(52) U.S. Cl. ..................... 370/390; 370/432
(58) Field of Classification Search .............. None
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey, Jr. et al. | |
| 5,018,133 A | 5/1991 | Tsukakoshi et al. | |
| 5,218,600 A | 6/1993 | Schenkyr et al. | |
| 5,371,852 A | 12/1994 | Attanasio et al. | |
| 5,414,704 A | 5/1995 | Spinney | |
| 5,473,599 A * | 12/1995 | Li et al. | 370/219 |
| 5,488,412 A | 1/1996 | Majeti et al. | |
| 5,506,987 A | 4/1996 | Abramson et al. | |
| 5,572,528 A | 11/1996 | Shuen | |
| 5,586,121 A | 12/1996 | Moura et al. | |
| 5,619,552 A | 4/1997 | Karppanen et al. | |
| 5,729,537 A | 3/1998 | Billstrom | |
| RE35,774 E | 4/1998 | Moura et al. | |
| 5,793,763 A | 8/1998 | Mayes et al. | |
| 5,818,845 A | 10/1998 | Moura et al. | |
| 5,825,759 A * | 10/1998 | Liu | 370/331 |
| 5,828,655 A | 10/1998 | Moura et al. | |
| 5,835,696 A * | 11/1998 | Hess | 714/10 |
| 5,859,852 A | 1/1999 | Moura et al. | |

(Continued)

FOREIGN PATENT DOCUMENTS

WO     WO98/31107     7/1998

OTHER PUBLICATIONS

Release notes for 3Com Corporation, "NETBuilder Family Bridge/Router", pp. 27-29, (Mar. 1994).
J. Moy, RFC 1247 "OSPF Version 2", Jul. 19, 1991.
D. Oran, RFC 1142 OSI IS-IS Intra-domain Routing Protocol, Feb. 1990.
Black, Uyless, "TCP/IP and Related Protocols", McGraw-Hill, Inc., pp. 226-249, 1992.
T. Li, et al., RFC 2281 "Cisco Hot Standby Router Protocol (HSRP)," March 1998.

(Continued)

*Primary Examiner*—Chirag G. Shah
(74) *Attorney, Agent, or Firm*—Beyer Weaver LLP

(57) ABSTRACT

Methods and apparatus for maintaining Mobile IP operation in a Home Agent are disclosed. In a Home Agent, a Mobile Node is registered and a registration entry is created in a mobility binding table for the Mobile Node. A multicast message is then sent to a virtual router group to which the Home Agent belongs and with which the Home Agent shares a virtual IP address. The multicast message notifies the virtual router group of the registration. A similar process may be performed when a Mobile Node is de-registered. When an active or non-active Home Agent is initialized, it sends a multicast mobility binding table request to the redundancy group indicating that bindings are requested. The Home Agent may then receive bindings in response to the request and update its mobility binding table with the received bindings.

53 Claims, 12 Drawing Sheets

U.S. PATENT DOCUMENTS

| | | | |
|---|---|---|---|
| 5,862,345 | A | 1/1999 | Okanoue et al. |
| 5,862,451 | A | 1/1999 | Grau et al. |
| 5,872,773 | A | 2/1999 | Katzela et al. |
| 5,892,903 | A | 4/1999 | Klaus |
| 5,943,604 | A | 8/1999 | Chen et al. |
| 5,946,047 | A | 8/1999 | Levan |
| 5,946,048 | A | 8/1999 | Levan |
| 5,949,753 | A * | 9/1999 | Alexander et al. .......... 370/216 |
| 5,950,205 | A | 9/1999 | Aviani, Jr. |
| 5,953,335 | A | 9/1999 | Erimli et al. |
| 5,956,346 | A | 9/1999 | Levan |
| 5,959,660 | A | 9/1999 | Levan |
| 5,959,968 | A | 9/1999 | Chin et al. |
| 5,959,997 | A | 9/1999 | Moura et al. |
| 5,982,745 | A * | 11/1999 | Wolff et al. .................. 370/219 |
| 5,989,060 | A | 11/1999 | Coile et al. |
| 5,999,536 | A | 12/1999 | Kawafuji et al. |
| 6,006,266 | A | 12/1999 | Murphy et al. |
| 6,016,388 | A | 1/2000 | Dillon |
| 6,052,718 | A | 4/2000 | Gifford |
| 6,078,575 | A * | 6/2000 | Dommety et al. .......... 370/338 |
| 6,195,705 | B1 * | 2/2001 | Leung ......................... 709/245 |
| 6,230,326 | B1 | 5/2001 | Unger et al. |
| 6,236,678 | B1 | 5/2001 | Horton et al. |
| 6,240,089 | B1 * | 5/2001 | Okanoue et al. ............ 370/390 |
| 6,295,276 | B1 | 9/2001 | Datta et al. |
| 6,298,063 | B1 | 10/2001 | Coile et al. .................. 370/401 |
| 6,339,830 | B1 | 1/2002 | See et al. .................... 713/202 |
| 6,345,294 | B1 | 2/2002 | O'Toole et al. |
| 6,389,027 | B1 | 5/2002 | Lee et al. |
| 6,397,260 | B1 * | 5/2002 | Wils et al. ................... 709/238 |
| 6,449,250 | B1 | 9/2002 | Otani et al. |
| 6,466,964 | B1 * | 10/2002 | Leung et al. ............... 709/202 |
| 6,487,605 | B1 * | 11/2002 | Leung ......................... 709/245 |
| 6,510,162 | B1 | 1/2003 | Fijolek et al. |
| 6,512,774 | B1 | 1/2003 | Vepa et al. |
| 6,556,591 | B2 | 4/2003 | Bernath et al. |
| 6,611,868 | B1 | 8/2003 | Arutyunov |
| 6,621,810 | B1 * | 9/2003 | Leung ......................... 370/338 |
| 6,636,498 | B1 * | 10/2003 | Leung ......................... 370/338 |
| 6,650,624 | B1 | 11/2003 | Quigley et al. |
| 6,650,641 | B1 * | 11/2003 | Albert et al. ................ 370/392 |
| 6,765,892 | B1 * | 7/2004 | Leung et al. ............... 370/332 |
| 6,779,039 | B1 | 8/2004 | Bommareddy et al. |
| 6,795,857 | B1 * | 9/2004 | Leung et al. ............... 709/224 |
| 6,801,949 | B1 | 10/2004 | Bruck et al. |
| 6,804,221 | B1 * | 10/2004 | Magret et al. .............. 370/338 |
| 2002/0012327 | A1 * | 1/2002 | Okada ......................... 370/328 |
| 2002/0120697 | A1 | 8/2002 | Generous et al. |
| 2002/0191562 | A1 * | 12/2002 | Kumaki et al. ............. 370/331 |
| 2003/0037165 | A1 | 2/2003 | Shinomiya et al. |

OTHER PUBLICATIONS

K. Egevang et al., "The IP Network Address Translator (NAT)", Network Working Group, pp. 1-10, May 1994.

Y. Rekhter, et al, "*Address Allocation for Private Internets,*" RFC: 1918, Network Working Group, Feb. 1996, 9 Pages.

P. Srisuresh, et al, "*Load Sharing Using IP Network Address Translation (LSNAT),*" RFC: 2391, Networking Working Group, Aug. 1998, 18 Pages.

P. Srisuresh, et al., "*IP Network Address Translator (NAT) Terminology and Considerations,*" RFC: 2663, Network Working Group, Aug. 1999, 30 Pages.

E. Gerich, "*Guidelines for Management of IP Address Space,*" RFC: 1466, Network Working Group, May 1993, 10 pages.

Chambless, et al., "Home Agent Redundancy Protocol (HARP)," Oct. 27, 1997.

Network Working Group, RFC 2002 "IP Mobility Support," Oct. 1996.

C.E. Perkins and T. Jagannadh, "DHCP for Mobile Networking with TCP/IP," IBM, Watson Research Center IEEE, Apr. 1995.

3Com Corporation, "Configuring Boundary Routing System Architecture," NETBuilder Family Bridge/Router Release Notes, Mar. 1994, pp. 26-29.

Zang, et al. "Method for a Cable Modem to Rapidly Switch to a Backup CMTS," U.S. Appl. No. 09/484,611, filed Jan. 18, 2000, 53 Pages.

Zang, et al. "Cable Network Redundancy Architecture," U.S. Appl. No. 09/484,612, filed Jan. 18, 2000, 60 pages.

Nosella, et al. "Gateway Load Balancing Protocol," U.S. Appl. No. 09/883,674, filed Jun. 18, 2001, 48 Pages.

Denny, et al. "Stateful Network Address Translation Protocol Implemented Over a Data Network," U.S. Appl. No. 09/735,199, filed Dec. 11, 2000, 67 Pages.

Kanekar, et al., "*Load Sharing and Redundancy Scheme,*" U.S. Appl. No. 09/342,589, filed Jun. 29, 1999, 75 Pages.

Woundy, et al. "Routing Protocol Based Redundancy Design for Shared-Access Networks," U.S. Appl. No. 09/484,189, filed Jan. 18, 2000, 53 Pages.

Kent Leung, "Mobile IP Mobility Agent Standby Protocol," U.S. Appl. No. 09/714,466, filed Nov. 14, 2000, 51 Pages.

Ian Wilson, "Redirection to a Virtual Router", U.S. Appl. No. 09/748,828, filed Dec. 26, 2000, 33 Pages.

Eager et al., "Adaptive Load Sharing in Homogeneous Distributed Systems," IEEE, Transactions on Software Engineering, vol. Se-12, No. 5, May 1986, pp. 662-675.

Akamai Technologies, Inc. -Global Internet Content Delivery-"How FreeFlow Works," webmaster@akamai.com 1999-2000.

Digital Island, Inc. -e-Business Without Limits-, "Enabling Technologies," http://www.digisle.net. No date.

Internap, "Preferred Collocation Services," http://www.internap.com Copyright © 2001 Internap Network Services Corporation.

Meyer, et al., Request For Comments No. 2026, entitled, "Generic Routing Encapsulation (GRE)," Jan. 2000, Internet Engineering Task Force, 9 pages.

Mockapetris, P., Request For Comments No. 1034, entitled, "Domain Names—Concepts and Facilities," Nov. 1987, Internet Engineering Task Force, 31 pages.

Information Sciences Institute, Request for Comments No. 793, entitled, "Transmission Control Protocol—DARPA Internet Program—Protocol Specification," Sep. 1981, Internet Engineering Task Force, 49 pages.

David M. Gifford, "Replica Routing," U.S. Appl. No. 09/472,964, filed Dec. 28, 1999, 37 Pages.

Johnson et al., "Dynamic Server Organization," U.S. Appl. No. 09/294,837, filed Apr. 19, 1999, 42, 1999, 42, Pages.

Lu et al., "Automatic Network Addresses Assignment and Translation Interference," U.S. Appl. No. 60/160,535, filed Oct. 20, 1999, 127 Pages.

Lu et al., "Method and Apparatus for Automatic Network Address Assignement," U.S. Appl. No. 60/178,063, filed Jan. 24, 2000, 74 Pages.

Johnson et al., "Method and Apparatus for Determining a Network Topology in the Presence of Network Address Translation," U.S. Provisional Patent Application No.: 60/178,062, filed Jan. 24, 2000, 32 Pages.

Toole et al., "Fast-Changing Network Status and Load Monitoring and Feedback," U.S. Appl. No. 60/177,985, filed Jan. 25, 2000, 20 Pages.

Kirk Johnson, "A Method and Apparatus for Minimalist Approach to Implementing Server Selection," U.S. Appl. No. 60/177,415, filed Jan. 21, 2000, 39 Pages.

PCT International Search Report with written opinion, Application No. PCT/US2004/019617, Int'l filing date Jun. 18, 2004, mailed Jul. 10, 2004.

Nosella et al., U.S. Appl. No. 09/883,674, filed Jun. 18, 2001, Office Action dated May 3, 2005.

* cited by examiner

| Node ID (e.g., IP address) 202 | Care-of address 204 |
|---|---|
|  |  |
|  |  |

FIGURE 2

| Type 1002 | Granted Lifetime 1004 | Remaining Lifetime 1006 |
| Home Address 1008 | Home Agent 1010 | Care-of Address 1012 |
| Identification 1014 | | |

FIGURE 10

| Type 1102 | Code 1104 | Home Address 1106 |
| Identification 1108 | | |

FIGURE 11

| Type 1202 | NumHA 1204 | Identification 1206 |
| Home Agent Address(es) 1208 | | |

FIGURE 12

| Type 1302 | Code 1304 | NumBind 1306 |
| MoreBind 1308 | Identification 1310 | Extensions 1312 |

FIGURE 13

| Type 1402 | Code 1404 | MoreBind 1406 |
| Identification 1408 | | |

FIGURE 14

METHODS AND APPARATUS FOR IMPLEMENTING HOME AGENT REDUNDANCY

BACKGROUND OF THE INVENTION

1. Field of the Invention

The present invention relates to Mobile IP network technology. More particularly, the present invention relates to methods and apparatus for enabling Home Agent redundancy.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of theIP Routing for Wireless/Mobile Hosts Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1A. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1A, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1A, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various agent solicitations and agent advertisements which form part of the Mobile IP protocol. When Mobile Node 6 engages with network segment 14, it composes a registration request for the Home Agent 8 to bind the Mobile Node's current location with its home location. Foreign Agent 10 then relays the registration request to Home Agent 8 (as indicated by the dotted line "Registration"). During the registration process, the Home Agent and the Mobile Node 6 may then negotiate the conditions of the Mobile Node's attachment to Foreign Agent 10. For example, the Mobile Node 6 may request a registration lifetime of 5 hours, but the Home Agent 8 may grant only a 3 hour period. Therefore, the attachment may be limited to a period of time. When the negotiation is successfully completed, Home Agent 8 updates an internal "mobility binding table" which links the Mobile Node's current location via its care-of address (e.g., a collocated care-of address or the Foreign Agent's IP address) to the identity (e.g., home address) of Mobile Node 6. Further, if the Mobile Node 6 registered via a Foreign Agent, the Foreign Agent 10 updates an internal "visitor table" which specifies the Mobile Node address, Home Agent address, etc. In effect, the Mobile Node's home base IP address (associated with segment 12) has been binded to the care-of address such as the Foreign Agent's IP address (associated with segment 14).

Now, suppose that Mobile Node 6 wishes to send a message to a Corresponding Node 18 from its new location. An output message from the Mobile Node is then packetized and forwarded through Foreign Agent 10 over the internet 4 to Corresponding Node 18 (as indicated by the dotted line "packet from MN") according to a standard internet protocol. If Corresponding Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Corresponding Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

FIG. 1B illustrates a significant problem with the Mobile IP system 2. If Home Agent 8 fails or otherwise become inoperative (due to a power failure, rebooting, scheduled maintenance, etc.), Mobile Node 6 is left without the ability to (1) receive new internet messages addressed to it at network segment 12 and (2) register with other Foreign Agents. In effect, Mobile Node 6 is cut-off from internet connection when Home Agent 8 goes down. This problem may extend to other Mobile Nodes supported by Home Agent 8. Often, a given Home Agent will be responsible for servicing numerous Mobile Nodes which may be based at sub-network 12, and hence, all registered Mobile Nodes will lose connectivity.

As shown in FIG. 1B, when Home Agent 8 fails, not only is network segment 12 disconnected from the internet, but Mobile Nodes at remote locations are also blocked from the registration and packet receipt functions of Mobile IP. In some networks, there may be other routers connecting segment 12 to the internet. Such additional routers would allow fixed hosts on the segment to maintain their internet connections but would not allow remote access to Mobile Nodes. Similarly, if Foreign Agent 10 should fail, all Mobile Nodes visiting sub-network 14 lose connections, even though there may be other routers on that sub-network.

A redundancy protocol known as Hot Standby Router Protocol ("HSRP") is widely used to back up primary routers for a network segment. In HSRP, a "standby" or "secondary" router is designated as the back-up to an "active" or "primary" router. The standby router is linked to the network segment or segments serviced by the active router. The active and standby routers share a "virtual IP address" and possibly a "virtual Media Access Control (MAC) address." All internet communication to and from the relevant sub-network employs the virtual IP and MAC addresses. At any given time, the active router is the only router adopting the virtual addresses. Then, if the active router should cease operation for any reason, the standby router immediately takes over its load (by adopting the virtual addresses). Further details of HSRP can be found in RFC 2281, "Cisco Hot Standby Router Protocol (HSRP)" by T. Li, B. Cole, P. Morton, and D. Li and in U.S. Pat. No. 5,473,599 issued to Li and Cole on Dec. 5, 1995. Both of these references are incorporated herein by reference in their entireties and for all purposes.

If Home Agent 8 participated in a HSRP (together with other routers connected to segment 12), its failure would allow those nodes currently plugged into sub-network 12 to maintain their communications with internet 4. However, its failure would leave Mobile Node 6 stranded on network segment 14. HSRP has no mechanism for handling internet communications via Mobile IP. This is partly due to the fact that in Mobile IP it is not enough to simply have a standby router ready to take over as active router. The Home Agent (active router) must carry-out higher level functions required by Mobile IP such as keeping track of the locations (and associated Foreign Agents) of the various Mobile Nodes for which it is responsible. Similarly, a Foreign Agent must keep track of visiting Mobile Nodes and their associated Home Agents.

One redundancy mechanism for Mobile IP has been proposed. It goes by the acronym HARP which stands for Home Agent Redundancy Protocol. It was presented in an Internet Engineering Task Force memo of Chambless and Binkley entitled "Home Agent Redundancy Protocol" and having a URL of ftp://ietf.org/internet-drafts/draft-chambless-mobileip-harp-00.txt. This protocol provides for a redundant or "peer" Home Agent which is intended to contain a record of the Mobile Node locations stored in the primary Home Agent. While this proposed protocol does provide a redundancy mechanism for Mobile IP Home Agents, it has certain short comings. Notably, it does not make use of a widely installed redundancy protocol. Therefore, to implement HARP, many enterprises must undertake a rather significant change to its existing network solution. More importantly, HARP is concerned only with Mobile IP. Many other network functions such as Network Address Translation ("NAT"), IP security, Reflexive Access List, etc.

all could profit from router redundancy. However, each of these has its own specific high level requirements (analogous to the mobility binding table required for Mobile IP). HARP cannot be easily extended to these Non-Mobile IP network functions.

Unlike HARP, HSRP is a widely installed redundancy protocol. However, even if HSRP were implemented as the underlying redundancy protocol to implement Home Agent redundancy in a Mobile IP environment, there are several disadvantages associated with HSRP. First, HSRP enables only one router for a given network segment to act as the standby router at a single point in time. In other words, a redundancy scheme implemented using HSRP could include only a single backup Home Agent. Second, HSRP must be implemented on the same Local Area Network (LAN). It would therefore be beneficial if Home Agent redundancy could be implemented to enable multiple Home Agents to act as a backup for an active router. Moreover, it would be desirable if such a scheme could be implemented in a Wide Area Network (WAN) as well as a LAN. In addition, it would be beneficial if such a Home Agent redundancy scheme could be implemented regardless of the underlying routing redundancy protocol used to support such a scheme.

For the above reasons, an improved Home Agent redundancy protocol is required for Mobile IP.

SUMMARY OF THE INVENTION

Methods and apparatus for maintaining Mobile IP operation in a mobility agent such as a Home Agent are disclosed. More particularly, this is accomplished through enabling information maintained by each mobility agent to be transferred among one another such that the information maintained by each is consistent. In this manner, multiple mobility agents may supply redundancy within a network.

In accordance with one aspect of the invention, a Home Agent (e.g., active Home Agent) sends a multicast message updating members of a virtual router group of a Mobile IP registration (or de-registration). First, a Mobile Node is registered and a registration entry is created in a mobility binding table for the Mobile Node. A multicast message is then sent to a virtual router group to which the active Home Agent belongs and with which the active Home Agent shares a virtual IP address. The multicast message notifies the virtual router group of the registration. A similar process is performed when a Mobile Node is de-registered.

In accordance with another aspect of the invention, when a Home Agent participating in the redundancy group is initialized, it sends a multicast mobility binding table request to the redundancy group indicating that bindings are requested. For instance the Home Agent may be active or non-active (e.g., standby, listening, or learning). The Home Agent may then receive bindings in response to the request and update its mobility binding table with the received bindings.

BRIEF DESCRIPTION OF THE DRAWINGS

FIG. 2 is a diagram illustrating an exemplary mobility binding table maintained by a Home Agent that may be updated in accordance with various embodiments of the invention.

FIG. 10 is a diagram illustrating an exemplary mobility binding table update that may be sent by an active Home Agent to other Home Agents in its virtual router group upon receipt of a valid registration request from a mobile node.

FIG. 11 is a diagram illustrating an exemplary acknowledgement message that may be sent by a peer Home Agent to the active Home Agent in response to receipt of the mobility binding table update such as that illustrated in FIG. 10.

FIG. 12 is a diagram illustrating an exemplary mobility binding table request message that may be sent by a Home Agent.

FIG. 13 is a diagram illustrating an exemplary binding table update message that may be sent in response to a binding table request message such as that illustrated in FIG. 12.

FIG. 14 is a diagram illustrating an exemplary acknowledgement message that may be sent in response to the binding table update message such as that illustrated in FIG. 13.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

The present invention supports a mechanism for implementing Home Agent redundancy. This is accomplished by enabling a mobility binding table maintained by a plurality of Home Agents to be maintained such that they are consistent with one another. Since all Home Agents within a particular redundancy group receive the same bindings, any one of these Home Agents may operate in place of a non-functioning Home Agent. In this manner, the ability of members of a redundancy group (e.g., HSRP group) that are in a non-active state such as a standby or "passive" state (e.g., listen or learn) may be leveraged. This is particularly important since previously implemented schemes have not leveraged those Home Agents in a passive state such as the listen or learn state. While the following description is illustrated with respect to HSRP, such a scheme may be applied to members of a redundancy group using any redundancy protocol, where each member is either a primary Home Agent (e.g., active) or a backup Home Agent (e.g., passive).

In the following description, the term "active" will be used interchangeably with the term "primary", and the term "backup" will be used interchangeably with the term "standby." A standby or backup router may, at times, be in a "passive" state. More particularly, members that are in a passive state typically gather information without interacting or sending information to other members in the redundancy group. For example, with respect to HSRP, the term active refers to an active state, while the term non-active refers to a standby or passive (e.g., listen or learn) state. However, these states are merely illustrative, and the terms active and passive may be interpreted generally as applied with respect to other protocols.

Each Home Agent within a particular redundancy group maintains its own internal mobility binding table. FIG. 2 is a diagram illustrating an exemplary mobility binding table that may be maintained by a Home Agent in accordance with various embodiments of the invention. As shown, each entry typically includes a node ID 202 such as an IP address and a care-of address 204. In addition, each entry also preferably includes a granted lifetime and remaining lifetime.

Figure 1A:
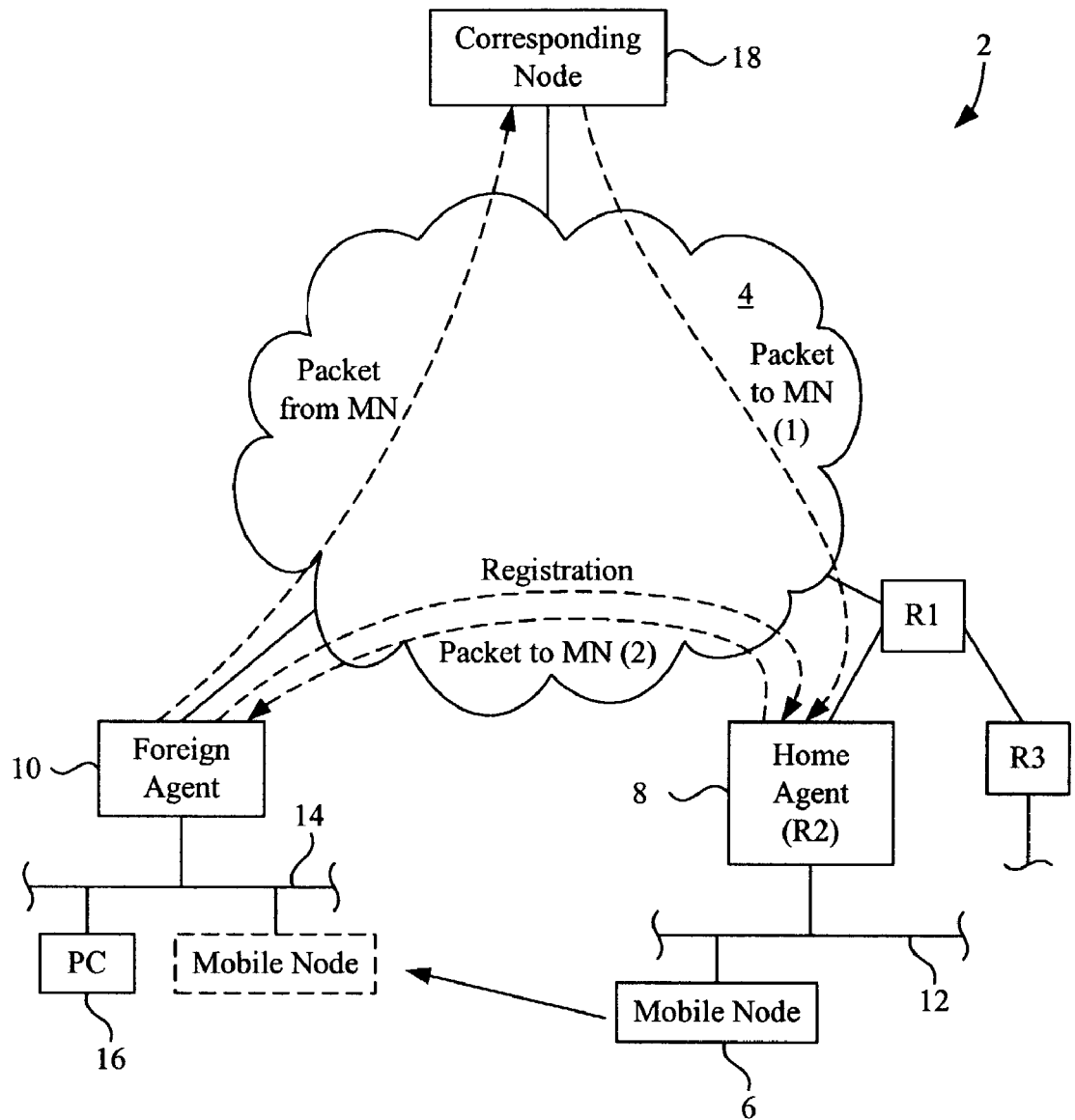
FIG. 1A is a diagram of a Mobile IP network segment and associated environment.
Figure 1B:
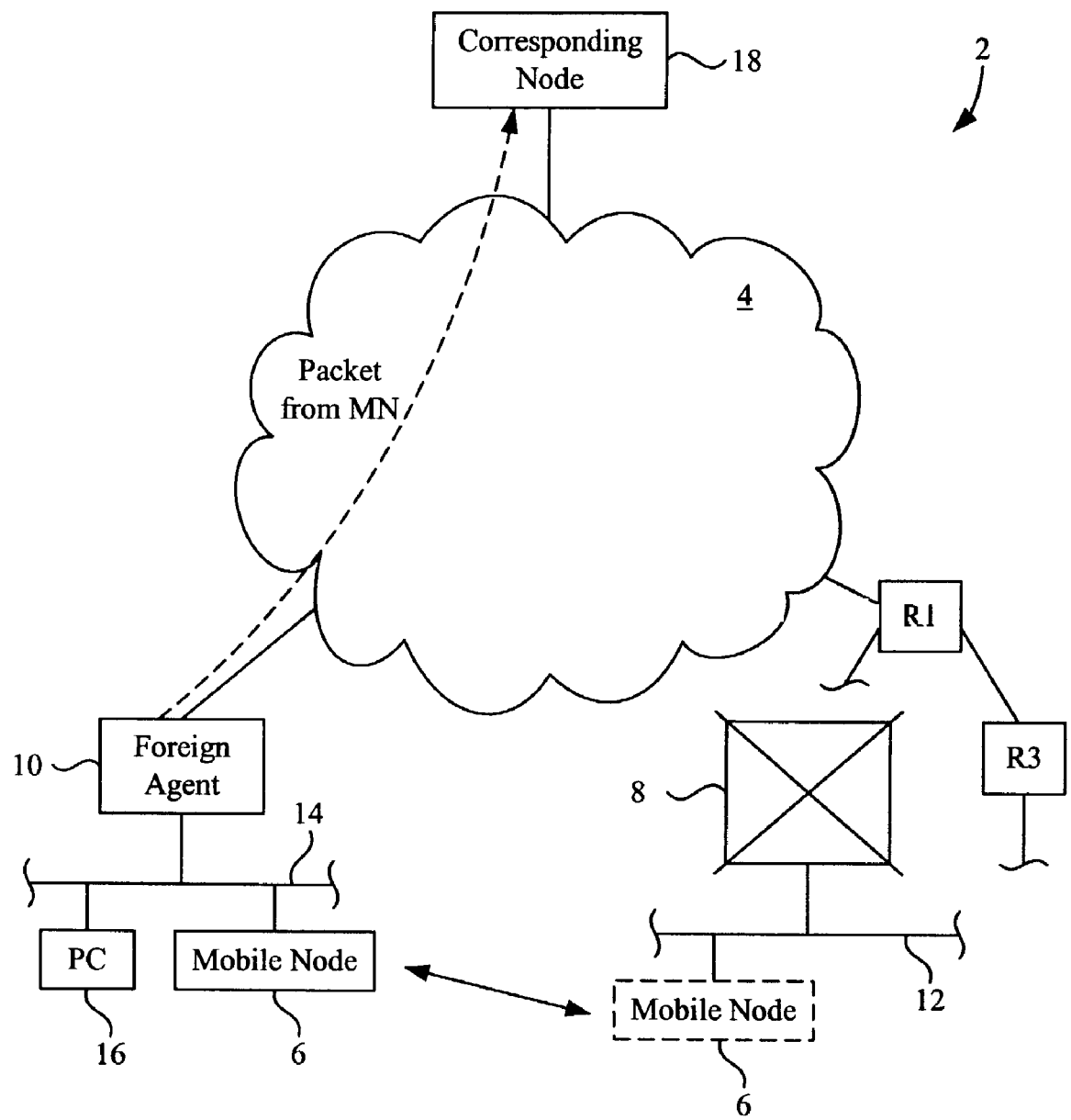
FIG. 1B is a diagram of the Mobile IP environment of FIG. 1A, depicting its limitations resulting from failure of a Home Agent.
Figure 3:
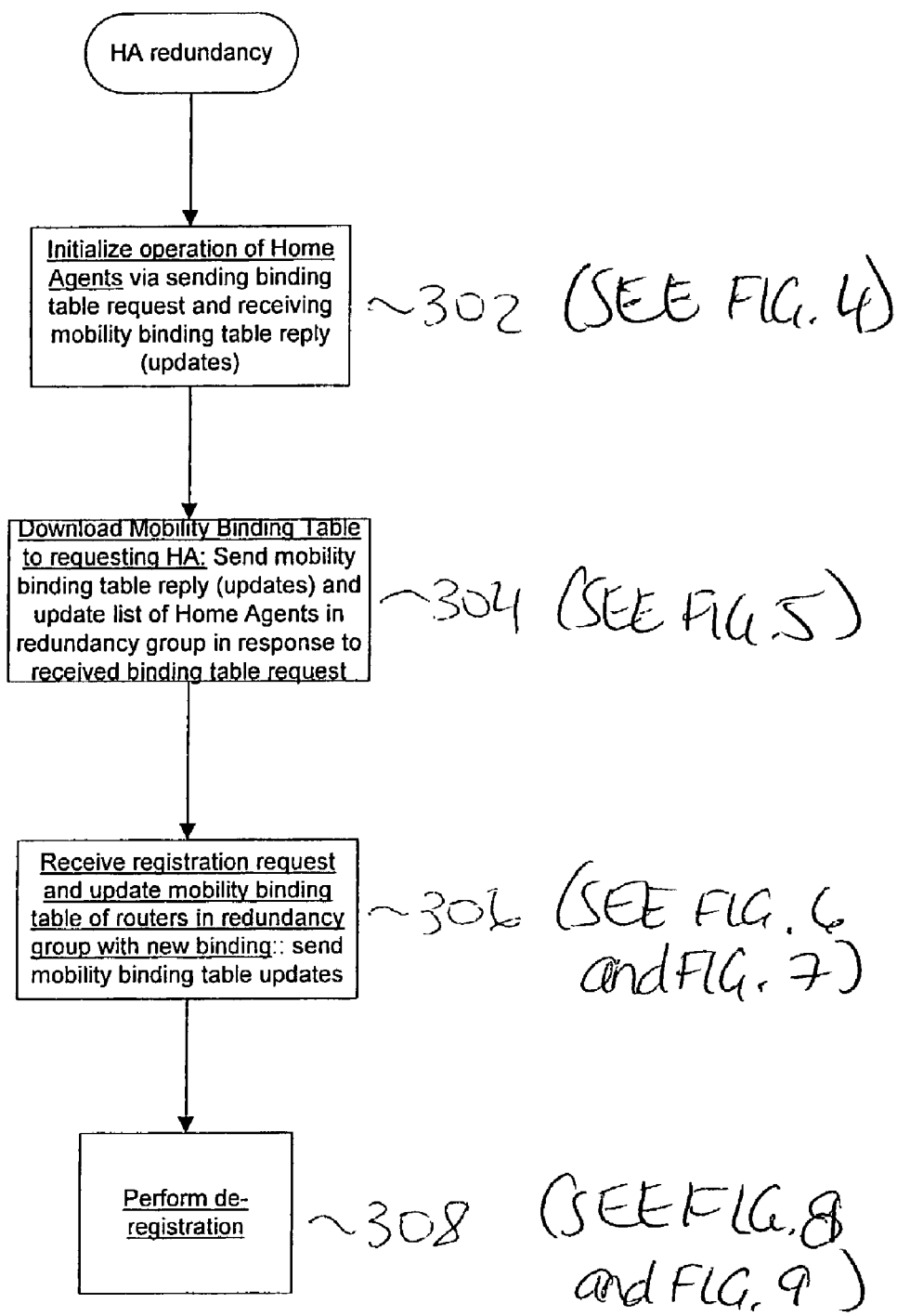
FIG. 3 is a process flow diagram illustrating a method of implementing Home Agent redundancy in accordance with one embodiment of the invention.

There are various ways in which a redundancy scheme may be implemented. FIG. 3 is a process flow diagram illustrating a method of implementing Home Agent redundancy in accordance with one embodiment of the invention. Each Home Agent in a particular redundancy group (e.g., virtual router group) is initialized at block 302 to enable each Home Agent to update its mobility binding table to contain bindings from other Home Agents that are members of the same virtual router group. One method of initializing the operation of a Home Agent is through sending a multicast binding table request and receiving mobility binding table updates in response to this request from the members of the virtual router group. Such an initialization process will be described in further detail below with reference to FIG. 4.

Once a Home Agent is initialized, it is capable of responding to Home Agents requesting mobility binding table updates. More particularly, the Home Agent may respond to such mobility binding table requests regardless of whether the Home Agent is active. For example, the Home Agent may be in a standby or listen mode. Thus, as shown at block 304, mobility binding table updates are sent in response to a received mobility binding table request. In addition, the Home Agent may update its list of Home Agents in its associated virtual router group using information provided in the mobility binding table request. One method of downloading a mobility binding table to a requesting Home Agent will be described in further detail below with reference to FIG. 5.

When a registration request is received by a Home Agent (e.g., Home Agent in an active or passive state) at block 306, the Home Agent sends a mobility binding table update to routers in the redundancy group to notify the routers of the new binding. One method of completing registration of a mobile node will be described in further detail below with reference to FIG. 6 and FIG. 7. Similarly, when a mobile node returns to its home subnet, de-registration is performed at block 308. Similarly, when the mobile node roams to a new Foreign Agent, de-registration may also be performed (in addition to sending a new registration request). One method of performing de-registration of a mobile node will be described in further detail below with reference to FIG. 8 and FIG. 9.

Figure 4:
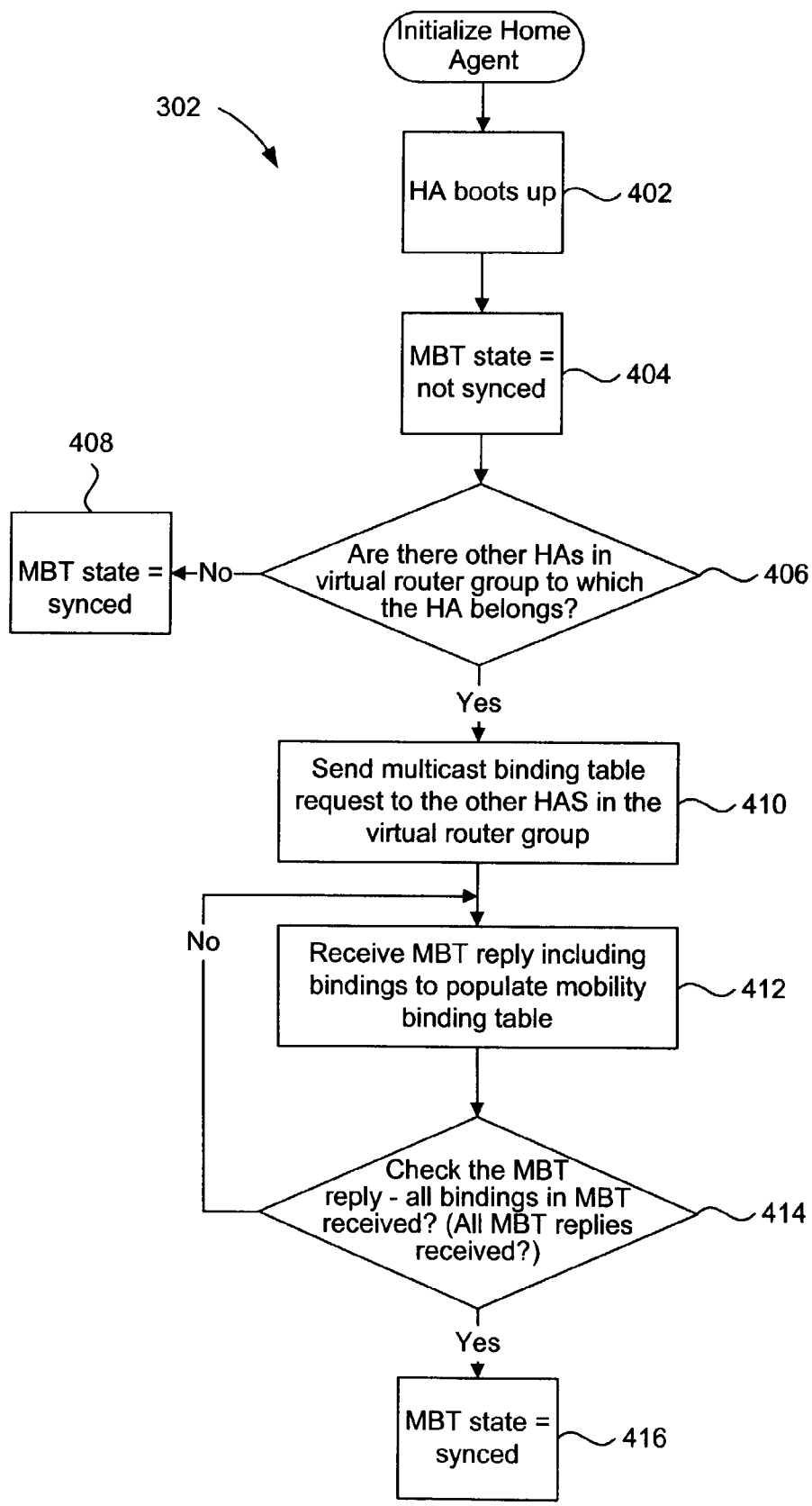
FIG. 4 is a process flow diagram illustrating a method of initializing a Home Agent as shown at block 302 of FIG. 3.

As described above with reference to block 302 of FIG. 3, a Home Agent may be initialized such that its mobility binding table contains bindings maintained by other Home Agents in its redundancy group. FIG. 4 is a process flow diagram illustrating a method of initializing a Home Agent as shown at block 302 of FIG. 3 in accordance with one embodiment of the invention. As shown at block 402, the Home Agent boots up and determines whether further initialization is necessary. More particularly, the Home Agent initializes the state of the mobility binding table=NOT SYNCED at block 404. It then determines whether one or more Home Agents other than the Home Agent being initialized are in the virtual router group at block 406. If there are no other Home Agents in the virtual router group, the state of the mobility binding table=SYNCED at block 408. Otherwise, if it is determined that there are other Home Agents in the virtual router group, a multicast mobility binding table request is sent at block 410 to the virtual router group. More particularly, the multicast mobility binding table request indicates that bindings present in a mobility binding table maintained by one or more members of the virtual router group are requested. An exemplary mobility binding table request will be described in further detail below with reference to FIG. 12.

When each Home Agent in the virtual router group receives the multicast mobility binding table request, it updates its list of Home Agents in the redundancy group, since the multicast mobility binding table request identifies the Home Agent sending the mobility binding table request. As described above, the Home Agent may, for example, be active, or may merely be a standby or listening Home Agent. When a receiving Home Agent receives the multicast mobility binding table request, it sends one or more reply messages (e.g., unicast message) including bindings associated with one or more mobile nodes. It is important to note that all Home Agents in the redundancy group have an identical mobility binding table. Thus, rather than requiring each Home Agent in the redundancy group to reply to a multicast mobility binding table request, a designated Home Agent in the redundancy group may reply to the request. Such reply messages are received by the requesting Home Agent at block 412, which and are then used to update its mobility binding table. An exemplary binding table reply message will be described in further detail below with reference to FIG. 13. This process continues at block 414 for the remaining bindings and reply messages. Once all bindings have been obtained from one or more Home Agents in its virtual router group (e.g., designated Home Agent), the mobility binding table state is changed to SYNCED at block 416. In this manner, the Home Agent can track the state of its initialization and whether its mobility binding table is current.

Figure 5:
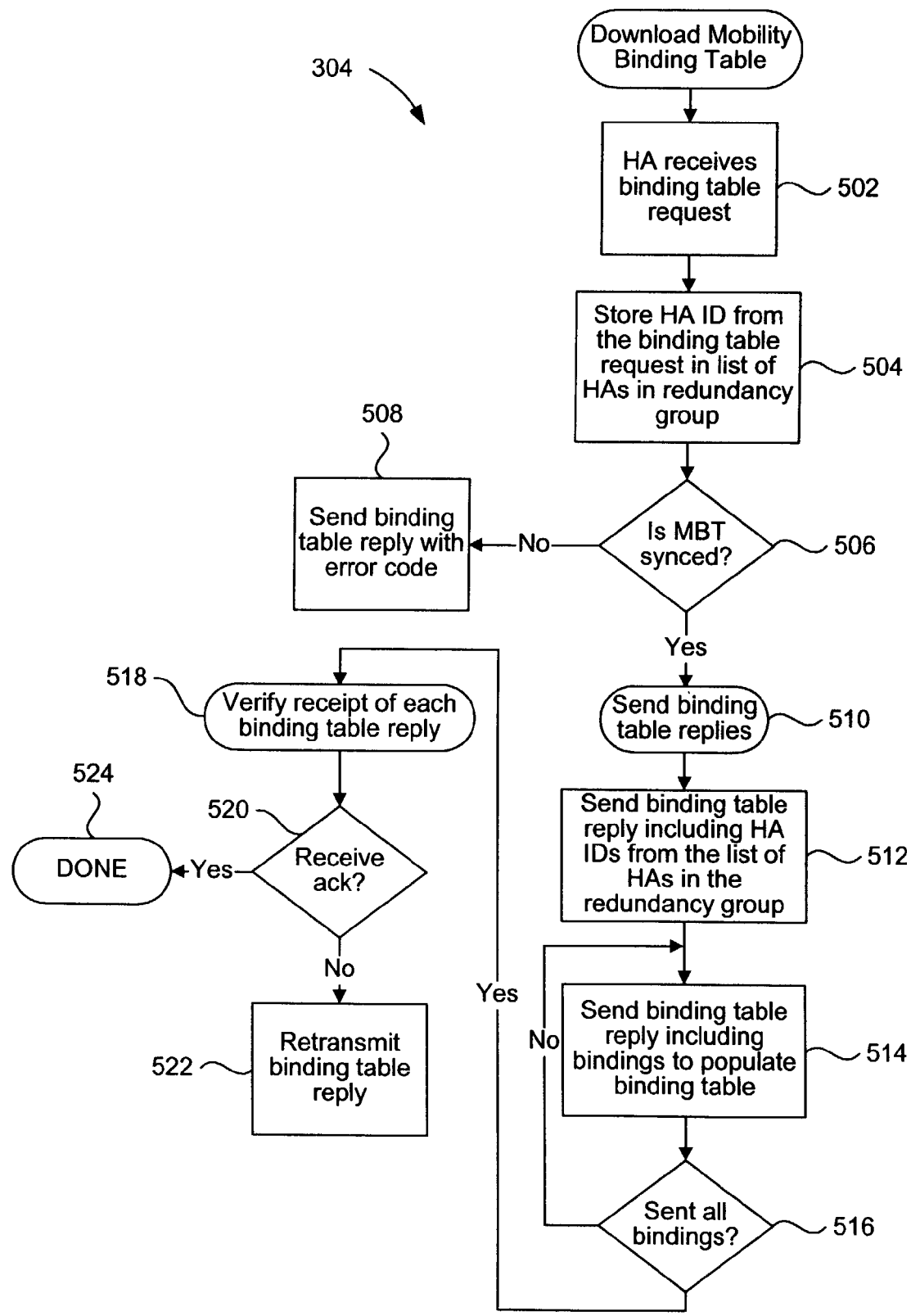
FIG. 5 is a process flow diagram illustrating a method of downloading a mobility binding table as shown at block 304 of FIG. 3.

Once a Home Agent has an updated mobility binding table, it may download bindings from its mobility binding table to other requesting Home Agents. FIG. 5 is a process flow diagram illustrating a method of downloading a mobility binding table as shown at block 304 of FIG. 3 in accordance with one embodiment of the invention. As shown at block 502, the Home Agent receives a multicast mobility binding table request addressed to the virtual router group. As described above, the mobility binding table request includes a Home Agent identifier associated with the Home Agent that has sent the mobility binding table request. Thus, the Home Agent stores the Home Agent identifier from the request in a list of Home Agents in the virtual router group at block 504. Through this list, the Home Agent may perform load balancing of registration requests it receives from various mobile nodes. Later, if the Home Agent sends a binding table update message, it may determine from this list from which Home Agents to expect an acknowledgement message.

Although a Home Agent need not be active in order to respond to a mobility binding table request, it should preferably have completed its initialization of its mobility binding table with bindings from other Home Agents in its redundancy group. Thus, at block 506, it determines whether its mobility binding table is initialized (e.g., synced). If its mobility binding table is not initialized, the Home Agent sends a binding table reply with an error code at block 508. More particularly, the error code may indicate that the mobility binding table maintained by the Home Agent is not initialized with bindings from other Home Agents in the virtual router group.

If the mobility binding table of the Home Agent has been initialized, it sends one or more binding table reply messages at block 510. As described above, an exemplary binding table reply message will be described in further detail below with reference to FIG. 13. More particularly, these reply messages are preferably unicast messages addressed to the Home Agent in the virtual router group from which the multicast mobility binding table request was received. As shown at block 512, one or more reply messages including one or more Home Agent identifiers identifying Home Agents in the virtual router group may be sent. For example, the Home Agent identifiers may be obtained from a list maintained by the Home Agent. More particularly, the Home Agent identifiers may be provided in a first reply message followed by bindings provided in subsequent reply messages. Once the Home Agents in the virtual router group are identified, this enables the receiving Home Agent to perform load balancing of registration requests it subsequently receives from various mobile nodes. In other words, registration requests may be relayed to any of the identified Home Agents according to any load balancing algorithm. More particularly, the receiving Home Agent may simply be in a listening state, but may perform load balancing when it subsequently becomes active. The receipt of such a list is important since underlying redundancy protocols do not provide periodic messaging to enable identification of other Home Agents to be performed. In addition, one or more reply messages including one or more bindings associated with one or more mobile nodes obtained from the mobility binding table maintained by the Home Agent are sent at block 514. Reply messages are sent until all bindings are transmitted to the requesting Home Agent at block 516.

In addition to the sending of binding table reply messages, the Home Agent also preferably verifies receipt of each binding table reply messages by the intended recipient at block 518. This verification is preferably performed in parallel with the sending of the reply messages, as shown. In other words, it is not necessary to send all reply messages prior to verifying receipt of the reply messages. Thus, as shown at block 520, it is determined for each binding table reply message whether an acknowledgement to the reply message has been received from the Home Agent. An exemplary acknowledgement message that may be sent in response to a binding table update message such as that illustrated in FIG. 13 will be described in further detail below with reference to FIG. 14. If an acknowledgement has not been received, the reply message is retransmitted to the Home Agent at block 522. Otherwise, when it is determined that all reply messages have been received by the Home Agent, the process is completed at block 524.

Figure 6:
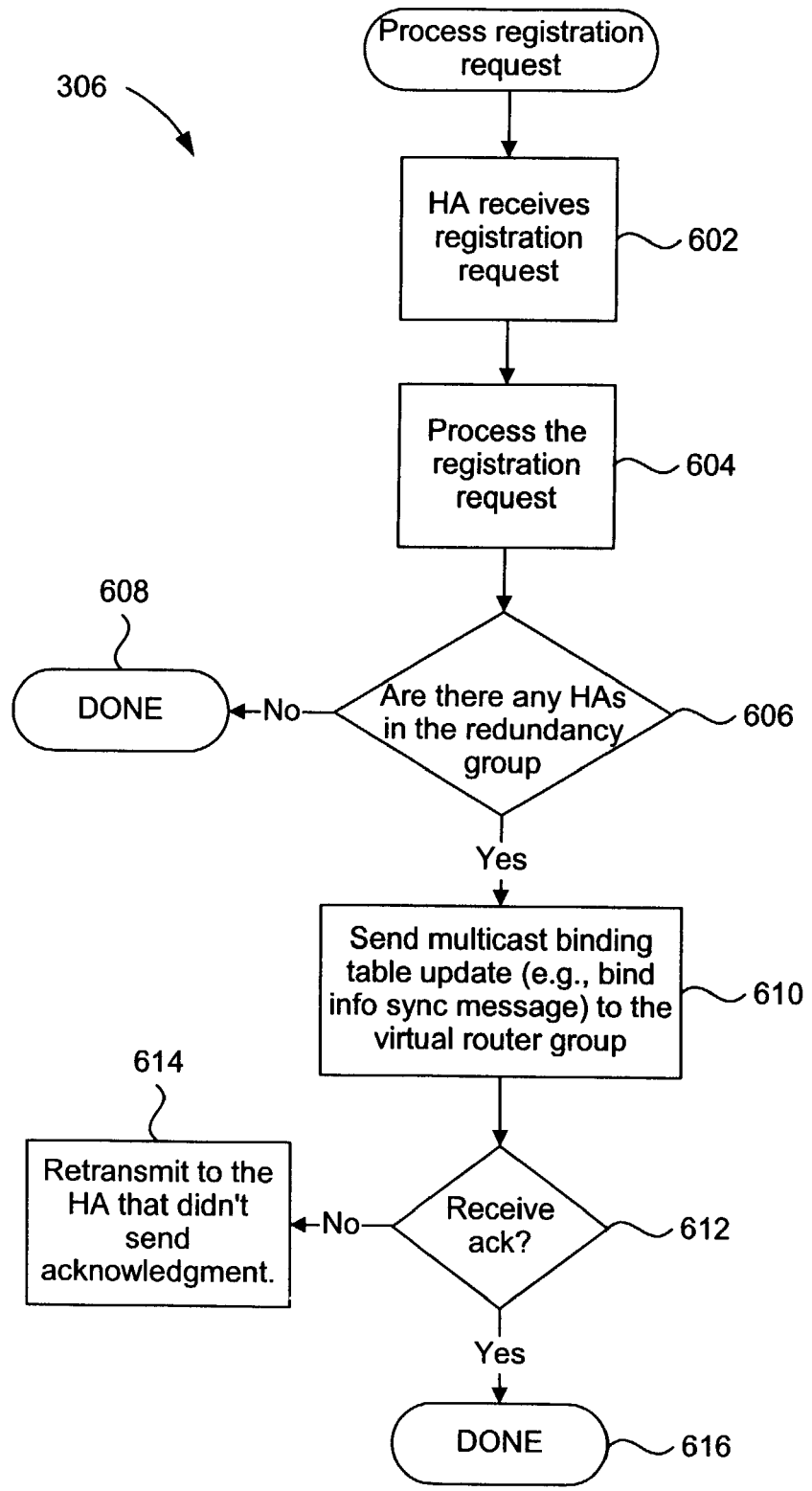
FIG. 6 is a process flow diagram illustrating a method of processing a registration request as shown at block 306 of FIG. 3.

A Home Agent in the redundancy group (e.g., active or passive) may receive and process a registration request received from a mobile node. FIG. 6 is a process flow diagram illustrating a method of processing a registration request as shown at block 306 of FIG. 3. After the Home Agent receives a registration request at block 602, the registration request is processed according to RFC 2002 such that the mobile node is registered with the Home Agent at block 604. For instance, a registration entry for the mobile node is created in a mobility binding table. If the Home Agent determines at block 606 that there are no other Home Agents in the virtual router group, the process ends at block 608. However, if there are other Home Agents in the virtual router group, a multicast binding table update is sent to a virtual router group to which the Home Agent belongs and with which the Home Agent shares a virtual IP address at block 610. The multicast binding table updates notifies the virtual router group of the registration of the mobile node with the Home Agent. An exemplary binding table update message that may be sent will be described in further detail below with reference to FIG. 10.

Once the multicast binding table update has been sent, the Home Agent preferably verifies receipt of the update by all other Home Agents in the virtual router group. Thus, at block 612 the Home Agent determines whether an acknowledgement to the multicast message has been received from a Home Agent in the virtual router group. If an acknowledgement has not been received from a Home Agent (e.g., within a specified period of time), a message is retransmitted to the Home Agent notifying the Home Agent of the registration at block 614. More particularly, this message may be a unicast message since the other Home Agents in the virtual router group have already acknowledged receipt of the multicast message. Once an acknowledgement has been received from the other Home Agents in the virtual router group, the process ends at block 616.

Figure 7:
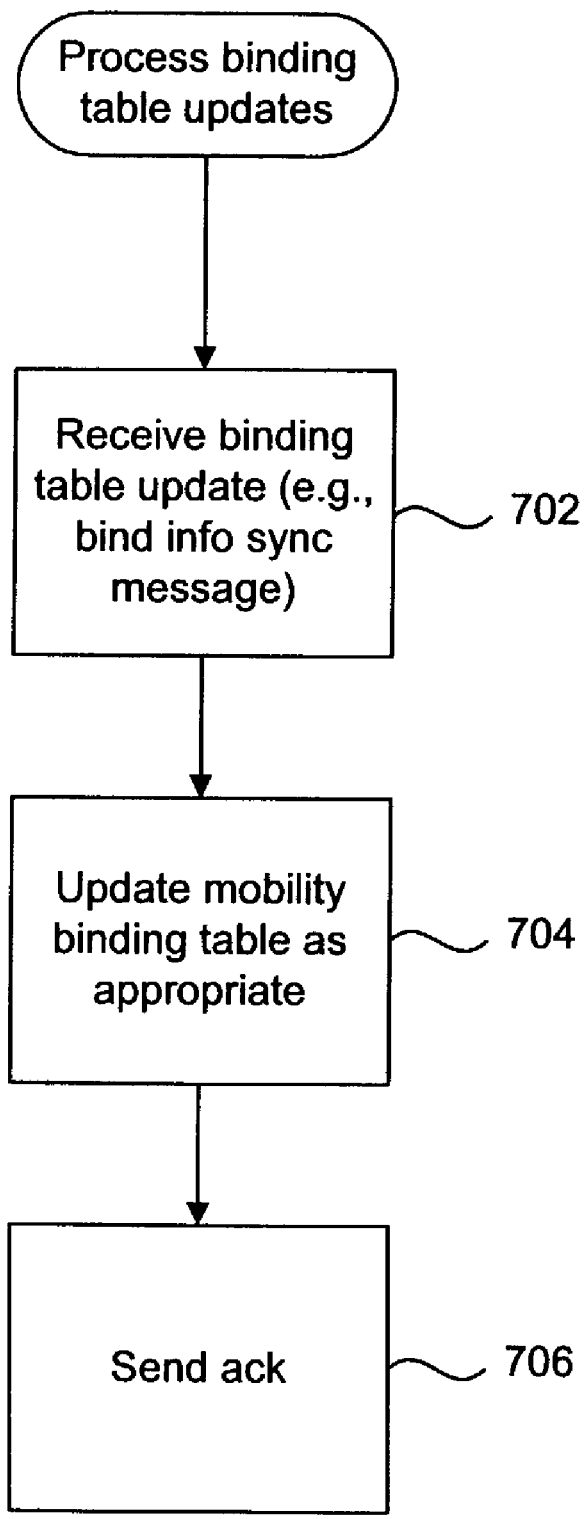
FIG. 7 is a process flow diagram illustrating a method of processing binding table updates sent at block 610 of FIG. 6.

As described above with reference to block 610 of FIG. 6, multicast binding table updates are sent to other Home Agents in the virtual router group. FIG. 7 is a process flow diagram illustrating a method of processing binding table updates sent at block 610 of FIG. 6 by a receiving Home Agent in accordance with one embodiment of the invention. A binding table update such as that described below with reference to FIG. 10 is received at block 702. More particularly, the binding table update includes at least one binding associated with a mobile node that has registered with a Home Agent (e.g., active or passive Home Agent). The receiving Home Agent (e.g., active or passive Home Agent) then updates its mobility binding table to include the binding at block 704. An acknowledgement message indicating receipt of the binding table update is then sent at block 706. An exemplary acknowledgement message will be described in further detail below with reference to FIG. 11.

When a mobile node returns to its home subnet or has roamed to a new Foreign Agent, the Home Agent de-registers the mobile node (in association with the Foreign Agent from which the mobile node has roamed). Typically, when a mobile node roams from a first Foreign Agent to a second Foreign Agent, de-registration is performed with respect to the first Foreign Agent while registration is performed such that the mobile node is associated with the second Foreign Agent. Of course, there is a period of time during which a mobile node may receive a message after it has roamed with the first Foreign Agent but before it has completed de-registration with respect to the first Foreign Agent. However, the Home Agent can detect when its information is not current, since the mobile node cannot be simultaneously located at two different Foreign Agents. Thus, in order for the Home Agent to detect which registration is the current registration, it is possible to simply determine the order of the registrations of the mobile node.

Figure 8:
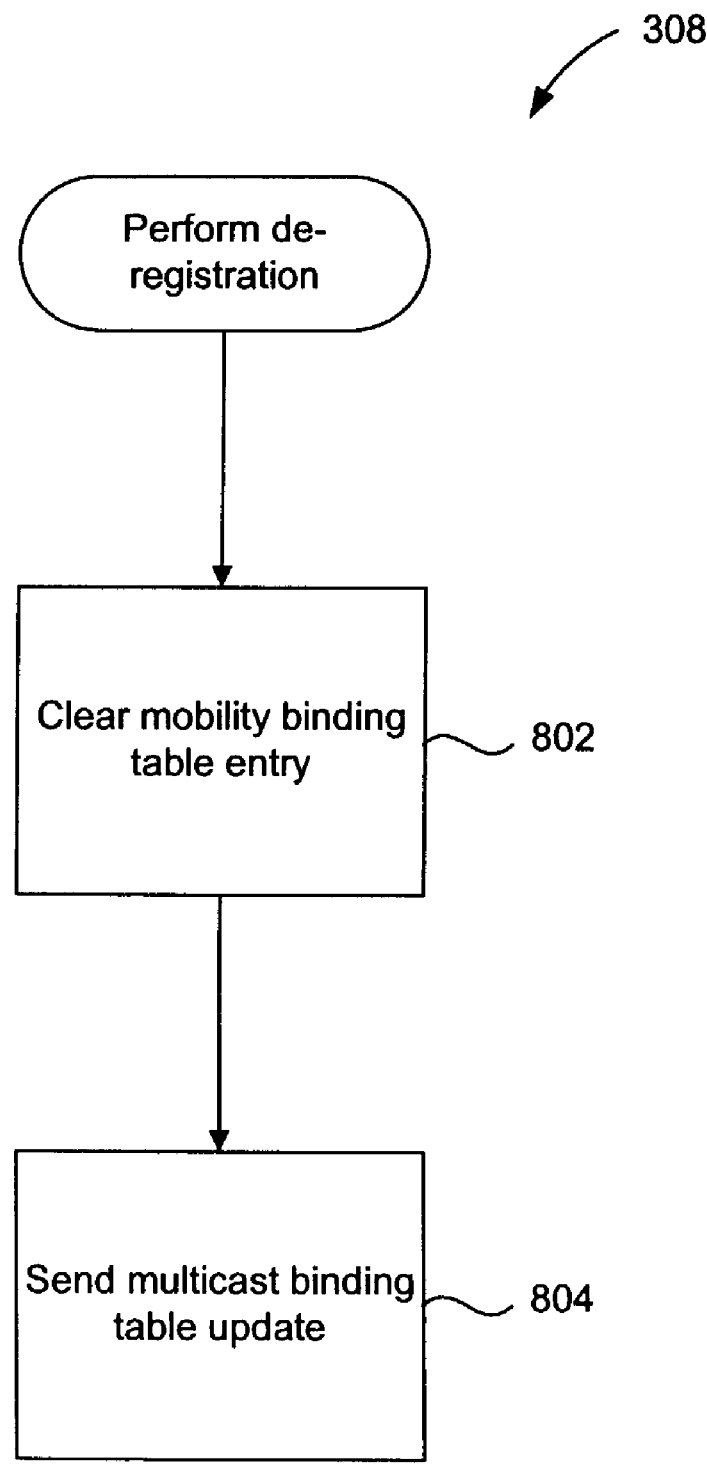
FIG. 8 is a process flow diagram illustrating a method of performing de-registration in accordance with one embodiment of the invention.

However, in accordance with the present invention, since bindings are sent to other Home Agents as well as the primary Home Agent (e.g., active Home Agent), there is the added possibility outdated bindings may be propagated to other Home Agents in a redundancy group. FIG. 8 is a process flow diagram illustrating a method of performing de-registration in accordance with one embodiment of the invention that alleviates the potential of propagating outdated bindings. Once the mobile node is de-registered with the Home Agent, the registration entry in the mobility binding table associated with the mobile node is updated (e.g., cleared) at block 802. A multicast binding table update is then sent to the virtual router group to which the Home Agent belongs and with which the Home Agent shares a virtual IP address at block 804. An exemplary multicast binding table update that may be sent will be described in further detail below with reference to FIG. 10. In this manner, the Home Agent notifies the virtual router group of the de-registration.

Figure 9:
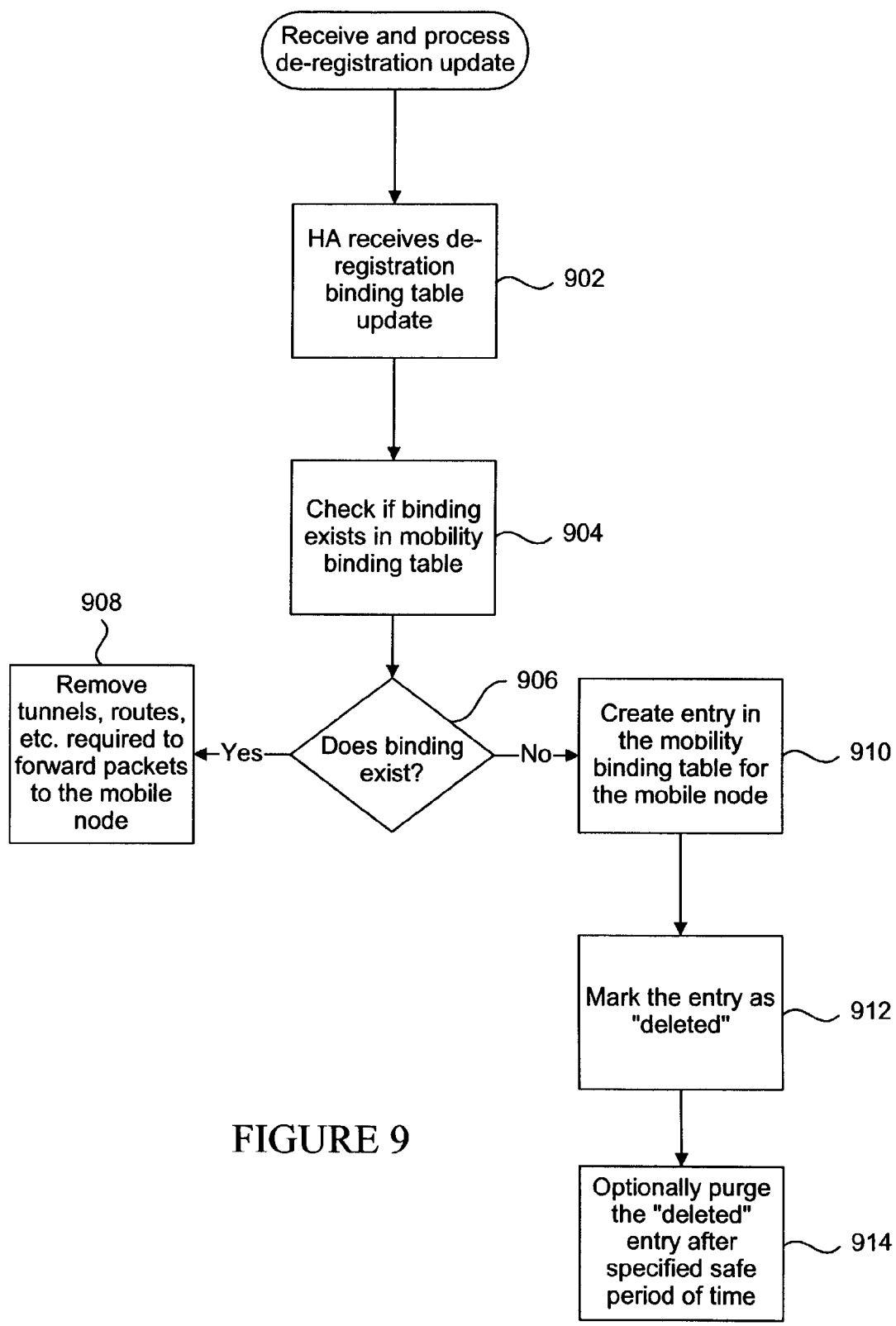
FIG. 9 is a process flow diagram illustrating a method of receiving and processing a de-registration update sent at block 804 of FIG. 8.

When a Home Agent (e.g., active or passive) receives a binding table update notifying it of a de-registration, it processes this information accordingly. FIG. 9 is a process flow diagram illustrating a method of receiving and processing a de-registration update sent at block 804 in accordance with one embodiment of the invention. When a Home Agent receives a de-registration binding table update indicating that a mobile node is no longer registered with another Home Agent at block 902, the receiving Home Agent updates its mobility binding table accordingly. More particularly, the receiving Home Agent determines whether a binding exists in its mobility binding table at block 904. If a binding exists as shown at block 906, the receiving Home Agent determines whether the de-registration request is more current than the binding. If the de-registration request is more current than the binding, the Home Agent updates its mobility binding table to remove the binding at block 908. In addition, the Home Agent removes tunnels and routes required to forward packets to the mobile node. If a binding does not exist in its mobility binding table, an entry is created in the mobility binding table for the mobile node at block 910 and the entry is marked as "deleted" at block 912. Then, if another binding table update for the mobile node is subsequently received, the Home Agent can check the time stamp of the binding table update against the time stamp associated with the "deleted" entry to determine which entry is most recent. If the "deleted" entry is most recent, the Home Agent clears its binding table of the "deleted" entry. However, if the incoming binding table update is more recent, the Home Agent updates its bindings to remove the "deleted" tag. This entry may be purged after a specified "safe" period of time at block 914 to enable memory to be freed for unnecessary entries.

As described above with reference to FIG. 6, when a registration request is received and processed by a Home Agent (e.g., active or passive Home Agent), the Home Agent sends a mobility binding table update at block 610 to provide other routers in its virtual router group with this new binding. FIG. 10 is a diagram illustrating an exemplary mobility binding table update that may be sent by a Home Agent to other Home Agents in its virtual router group upon receipt of a registration request from a mobile node. This message contains information from the registration request and in addition, two lifetime fields. In addition, type 1002 indicates that this message is a Home Agent redundancy message (e.g., binding information sync message). The two lifetime fields include a granted lifetime 1004 indicating a lifetime granted to the mobile node by the Home Agent and a remaining lifetime 1006 indicating a lifetime remaining until the mobile node's mobility binding expires. Remaining fields include information obtained from the registration request, such as a Home Address 1008 of the mobile node, Home Agent 1010 to which the registration request was transmitted, care-of address 1012 of the Foreign Agent to which the mobile node has roamed, and Identification 1014 for use in identifying the mobility binding table update message. The Identification field 1014 may be used to verify and match valid acknowledgement messages, which will be described in further detail below with reference to FIG. 7.

As described above with reference to FIG. 7, when a mobility binding table update is received by a Home Agent (e.g., active or passive Home Agent), the receiving Home Agent preferably acknowledges receipt of this update as described above with reference to block 706. FIG. 11 is a diagram illustrating an exemplary acknowledgement message that may be sent by a peer Home Agent to the sending Home Agent in response to receipt of the mobility binding table update such as that illustrated in FIG. 10. Type 1102 indicates that this message is a Home Agent redundancy message (e.g., binding information sync acknowledgement message). In addition, a code 1104 indicates the result of the mobility binding table update message sent in response to receipt of a registration request. More particularly, the code 1104 indicates whether the registration update message was accepted by the receiving Home Agent, an unspecified reason for non-acceptance of the registration, whether the registration is prohibited for an administrative reason (e.g., authentication failed), or that there are insufficient resources (e.g., memory) to the registration. In addition, the acknowledgement message includes the Home Address 1106 of the mobile node obtained from the received mobility binding table update message (e.g., bind information sync message) and the Identification 1108 obtained from the mobility binding table update message. The identification field enables the acknowledgement messages to be matched with the mobility binding table update messages and further protects against replay attacks of the messages.

As described above with reference to block 410 of FIG. 4, during initialization of a Home Agent, it may request bindings from other Home Agents in its virtual router group. FIG. 12 is a diagram illustrating an exemplary mobility binding table request that may be sent by a Home Agent. This mobility binding table request is preferably a multicast message, but may also be a unicast message. Moreover, such a message is preferably sent by a peer Home Agent either prior to assuming a standby role or after assuming the standby role. The type 1202 indicates that this message is a Home Agent redundancy message (e.g., binding table request message). In addition, a NumHA field 1204 may be used to indicate a number of Home Agent addresses for which the Home Agent is requesting that bindings be downloaded. Alternatively, the default may be to request that all bindings be downloaded, without specifying the number of Home Agent addresses. An Identification field 1206 is used to identify the request. Moreover, Home Agent Address (es) 1208 may be used to indicate Home Agents for addresses that should be downloaded corresponding to the NumHA field 1204. More particularly, the Home Agent Address(es) 1208 may simply specify that all address bindings should be downloaded, in which case the NumHA field 1204 may be set to a pre-defined constant.

When a binding table request is received by a Home Agent (e.g., active or passive), a binding table reply message is sent as described above with reference to block 412 of FIG. 4 and FIG. 5. FIG. 13 is a diagram illustrating an exemplary binding table update message that may be sent in response to a binding table request message such as that illustrated in FIG. 12. The Type 1302 indicates that this message is a Home Agent redundancy message (e.g., binding table sync message). In addition, Code 1304 may include a value indicating the result of receipt of the binding table request. For instance, the Code 1304 may indicate whether the binding table request message was accepted by the sending Home Agent, an unspecified reason for non-acceptance of the message, whether processing of the message is prohibited for an administrative reason (e.g., mobility binding table has not been initialized) or that there are insufficient resources (e.g., memory) to process and/or adequately respond to the message. For example, as described above with reference to block 508 of FIG. 5, a reply message with an error code may be returned when the mobility binding table is not "SYNCED." In addition, multiple binding table reply messages may be sent as described above with reference to blocks 510–516 of FIG. 5. Thus, NumBind field 1306 may be used to indicate the number of mobile node bindings included in a particular binding table sync message. In adddition, a MoreBind field 1308 may be used to indicate the number of mobile node bindings transmitted thus far (including this message). An Identification field 1310 may be used to identify this message so that it may be matched with a corresponding acknowledgement message, described below with reference to FIG. 14, as well as the corresponding binding table request message. One or more extensions 1312 may also be appended for transmitting each binding.

As described above with reference to blocks 518–522 of FIG. 5, a Home Agent transmitting bindings to another Home Agent preferably verifies whether the receiving Home Agent has acknowledged those bindings. FIG. 14 is a diagram illustrating an exemplary acknowledgement message that may be sent in response to the binding table update message such as that illustrated in FIG. 13. The Type 1402 indicates that this message is a Home Agent redundancy message (e.g., binding table sync acknowledgement message). In addition, Code 1404 may be a value indicating the result of receipt of the binding table sync message. For instance, the Code 1404 may indicate whether the binding table sync message and associated bindings were accepted by the receiving Home Agent, an unspecified reason for non-acceptance of the message, whether processing of the message is prohibited for an administrative reason (e.g., authentication failure) or that there are insufficient resources (e.g., memory) to process and/or adequately respond to the message. The message may also include MoreBind field 1406 from the binding table sync message and the Identification field 1408 from the binding table sync message. Thus, the MoreBind field 1406 and the Identification field 1408 may be used, separately or in combination, to match the binding table sync acknowledgement message of FIG. 14 with the binding table sync message of FIG. 13. The Identification field 1408 may also be used to match the binding table sync acknowledgement message of FIG. 14 with the original binding table request of FIG. 12.

The above-described messages are merely illustrative. Thus, these messages may include additional or alternative fields. In addition, various features are not shown to simplify the illustrations. For instance, each Home Agent redundancy message sent by a Home Agent, such as those described above with reference to FIG. 10 through FIG. 14, preferably include a Home Agent-Home Agent Authentication Extension to be used for authenticating messages sent between the Home Agents. Thus, in order to provide such an authentication extension, the Home Agents preferably share a single key.

The present invention enables multiple Home Agents to provide redundancy, where each of the Home Agent preferably implements an underlying routing redundancy protocol. For instance, the routing redundancy protocol may be HSRP or Virtual Router Redundancy Protocol (VRRP).

Other Embodiments

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Home Agents of this invention may be implemented in specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 15:
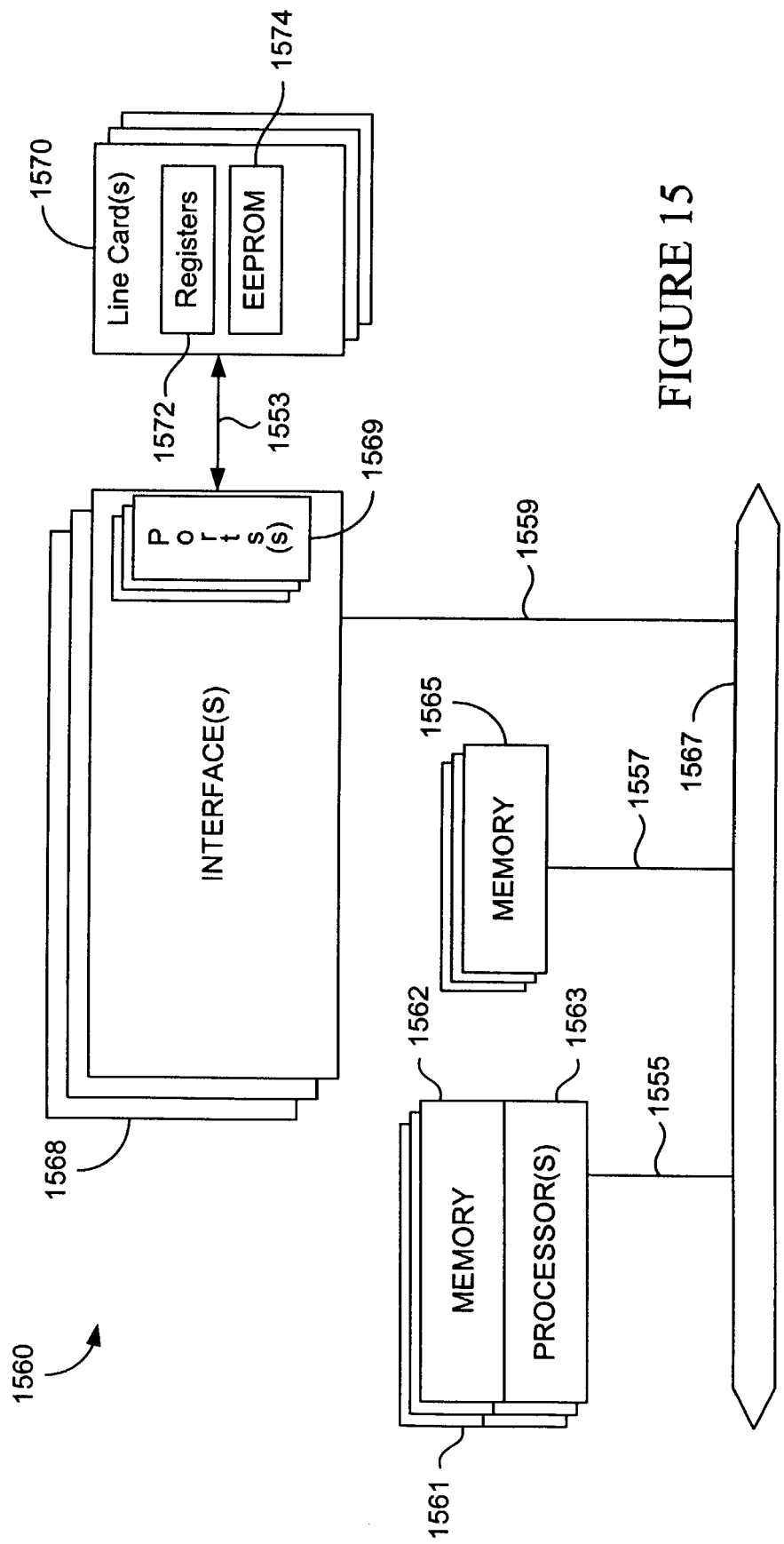
FIG. 15 is a diagram illustrating an exemplary network device in which embodiments of the invention may be implemented.

Referring now to FIG. 15, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 15 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a computer, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented to enable Home Agents to operate to receive updates, regardless of their size. Although the terms passive and active are used in various exemplary descriptions above, the above-described embodiments may also be implemented with Home Agents in other states (e.g., standby). However, it should be understood that the invention is not limited to such implementations, but instead would equally apply regardless of the context and system in which it is implemented. Thus, broadly speaking, the operations described above may be used to enable redundancy with respect to other mobility agents, such as Foreign Agents. In addition, the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. In a Home Agent, a method of maintaining Mobile IP operation, the method comprising:
   registering a mobile node;
   creating a registration entry for the Mobile Node in a mobility binding table;
   sending a multicast message to a virtual router group to which the Home Agent belongs and with which the Home Agent shares a virtual IP address, the multicast message notifying the virtual router group of the registration; and
   determining whether one or more Home Agents other than the Home Agent are in the virtual router group prior to sending the multicast message.

2. In a Home Agent, a method of maintaining Mobile IP operation, the method comprising:
   registering a mobile node;
   creating a registration entry for the Mobile Node in a mobility binding table;
   sending a multicast message to a virtual router group to which the Home Agent belongs and with which the Home Agent shares a virtual IP address, the multicast message notifying the virtual router group of the registration;
   determining whether an acknowledgement to the multicast message has been received from another Home Agent in the virtual router group; and
   when it is determined that an acknowledgement has not been received from the Home Agent in the virtual router group, retransmitting a message to the Home Agent notifying the Home Agent of the registration.

3. In a Home Agent, a method of maintaining Mobile IP operation, the method comprising:
   registering a mobile node;
   creating a registration entry for the Mobile Node in a mobility binding table;
   sending a multicast message to a virtual router group to which the Home Agent belongs and with which the Home Agent shares a virtual IP address, the multicast message notifying the virtual router group of the registration; and
   prior to registering a mobile node, sending a multicast mobility binding table request to the virtual router group indicating that bindings present in a mobility binding table maintained by one or more members of the virtual router group are requested.

4. The method as recited in claim 3, wherein sending a multicast mobility binding table request is performed prior to assuming Home Agent responsibilities with the virtual router group.

5. The method as recited in claim 3, wherein the multicast mobility binding table request includes a Home Agent identifier associated with the Home Agent.

6. The method as recited in claim 3, further comprising:
   receiving one or more reply messages including one or more bindings associated with one or more mobile nodes; and
   updating the mobility binding table maintained by the Home Agent with the bindings received in the reply messages.

7. The method as recited in claim 3, further comprising:
   determining whether one or more Home Agents other than the Home Agent are in the virtual router group prior to sending the multicast mobility binding table request.

8. In a Home Agent, a method of maintaining Mobile IP operation, the method comprising:
   registering a Mobile Node;
   creating a registration entry for the Mobile Node in a mobility binding table;
   sending a multicast message to a virtual router group to which the Home Agent belongs and with which the Home Agent shares a virtual IP address, the multicast message notifying the virtual router group of the registration; and
   receiving a multicast mobility binding table request from another Home Agent in the virtual router group, the multicast mobility binding table request being addressed to the virtual router group and indicating that bindings present in a mobility binding table maintained by members of the virtual router group are requested.

9. The method as recited in claim 8, wherein the multicast mobility binding table request includes a Home Agent identifier associated with another Home Agent that has sent the multicast mobility binding table request, the method further comprising:
   storing the Home Agent identifier in a list of Home Agents in the virtual router group.

10. The method as recited in claim 8, further comprising:
    sending one or more reply messages to the Home Agent in the virtual router group from which the multicast mobility binding table request was received, the reply messages including one or more bindings associated with one or more mobile nodes from the binding table maintained by the Home Agent.

11. The method as recited in claim 10, wherein the Home Agent is designated as one of a plurality of Home Agents in the virtual router group to respond to mobility binding table requests.

12. The method as recited in claim 10, further comprising:
    determining whether an acknowledgement to the reply messages has been received from the Home Agent in the virtual router group;
    when it is determined that an acknowledgement has not been received from the Home Agent in the virtual router group, retransmitting one or more of the reply messages to the Home Agent.

13. The method as recited in claim 10, further comprising:
    sending a reply message including one or more Home Agent identifiers identifying Home Agents in the virtual router group.

14. The method as recited in claim 8, further comprising:
    sending a reply message including one or more Home Agent identifiers identifying Home Agents in the virtual router group, the one or more Home Agent identifiers being obtained from a list maintained by the Home Agent.

15. The method as recited in claim 14, further comprising:
determining whether an acknowledgement to the reply messages has been received from the Home Agent in the virtual router group;
when it is determined that an acknowledgement has not been received from the Home Agent in the virtual router group, retransmitting the reply message to the Home Agent.

16. The method as recited in claim 8, further comprising:
sending a binding table reply indicating that the mobility binding table maintained by the Home Agent is not initialized with bindings from other Home Agents in the virtual router group.

17. The method as recited in claim 3, further comprising:
de-registering the mobile node;
updating the registration entry in the mobility binding table for the Mobile Node; and
sending a multicast message to the virtual router group to which the Home Agent belongs and with which the Home Agent shares a virtual IP address, the multicast message notifying the virtual router group of the de-registration.

18. The method as recited in claim 3, wherein the Home Agent implements a routing redundancy protocol.

19. The method as recited in claim 18, wherein the routing redundancy protocol is one of HSRP and VRRP.

20. In a Home Agent, the Home Agent being a member of a redundancy group including one or more Home Agents, a method of providing Mobile IP redundancy, the method comprising:
sending a multicast mobility binding table request to the redundancy group indicating that bindings present in a mobility binding table maintained by one or more members of the redundancy group are requested;
receiving one or more reply messages including one or more bindings associated with one or more mobile nodes;
updating a mobility binding table maintained by the Home Agent with the bindings received in the reply messages;
receiving one or more reply messages including one or more Home Agent identifiers identifying Home Agents in the redundancy group; and
updating a list of Home Agents in the redundancy group such that the list includes the Home Agent identifiers.

21. The method as recited in claim 20, wherein the Home Agent is not active.

22. The method as recited in claim 20, wherein the Home Agent is in a passive state.

23. The method as recited in claim 20, wherein the Home Agent is in a standby, listening, or learn state.

24. The method as recited in claim 20, wherein the multicast mobility binding table request includes a Home Agent identifier associated with the Home Agent.

25. In a Home Agent, the Home Agent being a member of a redundancy group including one or more Home Agents, a method of providing Mobile IP redundancy, the method comprising:
sending a multicast mobility binding table request to the redundancy group indicating that bindings present in a mobility binding table maintained by one or more members of the redundancy group are requested;
receiving one or more reply messages including one or more bindings associated with one or more mobile nodes;
updating a mobility binding table maintained by the Home Agent with the bindings received in the reply messages; and
determining whether one or more Home Agents other than Home Agent are in the virtual router group prior to sending the multicast mobility binding table request.

26. In a Home Agent, the Home Agent being a member of a redundancy group including one or more Home Agents, a method of providing Mobile IP redundancy, the method comprising:
sending a multicast mobility binding table request to the redundancy group indicating that bindings present in a mobility binding table maintained by one or more members of the redundancy group are requested;
receiving one or more reply messages including one or more bindings associated with one or more mobile nodes;
updating a mobility binding table maintained by the Home Agent with the bindings received in the reply messages;
receiving a binding table update including a binding associated with a mobile node that has registered with another Home Agent; and
updating the mobility binding table maintained by the Home Agent to include the binding.

27. The method as recited in claim 26, wherein the another Home Agent is in a passive state.

28. The method as recited in claim 26, wherein the another Home Agent is in an active state.

29. The method as recited in claim 26, further comprising:
sending an acknowledgement of receipt of the binding table update.

30. The method as recited in claim 26, further comprising:
receiving a binding table update indicating that the mobile node is no longer registered with the another Home Agent; and
updating the mobility binding table maintained by the Home Agent to remove the binding.

31. In a Home Agent, the Home Agent being a member of a redundancy group including one or more Home Agents, a method of providing Mobile IP redundancy, the method comprising:
sending a multicast mobility binding table request to the redundancy group indicating that bindings present in a mobility binding table maintained by one or more members of the redundancy group are requested;
receiving one or more reply messages including one or more bindings associated with one or more mobile nodes;
updating a mobility binding table maintained by the Home Agent with the bindings received in the reply messages;
receiving a binding table update indicating that a specified mobile node is no longer registered with the another Home Agent;
determining whether a binding exists in the mobility binding table maintained by the Home Agent for the specified mobile node;
when it is determined that a binding exists in the mobility binding table maintained by the Home Agent for the specified mobile node, removing the binding from the mobility binding table; and
when it is determined that a binding does not exist in the mobility binding table maintained by the Home Agent for the specified mobile node, creating an entry in the mobility binding table for the specified mobile node and marking the entry as deleted.

32. The method as recited in claim 31, further comprising: purging the creating entry after a specified period of time.

33. The method as recited in claim 20, wherein the Home Agent implements a routing redundancy protocol.

34. The method as recited in claim 33, wherein the routing redundancy protocol is one or HSRP and VRRP.

35. In a Home Agent, the Home Agent being a member of a redundancy group including one or more Home Agents, a method of providing Mobile IP redundancy, the method comprising:
   sending a multicast mobility binding table request to the redundancy group indicating that bindings present in a mobility binding table maintained by one or more members of the redundancy group are requested;
   receiving one or more reply messages including one or more bindings associated with one or more mobile nodes;
   updating a mobility binding table maintained by the Home Agent with the bindings received in the reply messages;
   receiving a multicast mobility binding table request from another Home Agent in the virtual router group, the multicast mobility binding table request being addressed to the virtual router group and indicating that bindings present in a mobility binding table maintained by members of the virtual router group are requested.

36. The method as recited in claim 35, wherein the multicast mobility binding table request includes a Home Agent identifier associated with another Home Agent that has sent the multicast mobility binding table request, the method further comprising:
   storing the Home Agent identifier in a list of Home Agents in the virtual router group.

37. The method as recited in claim 35, further comprising: sending one or more reply messages to the Home Agent in the virtual router group from which the multicast mobility binding table request was received, the reply messages including one or more bindings associated with one or more mobile nodes from the binding table maintained by the Home Agent.

38. The method as recited in claim 37, further comprising: determining whether an acknowledgement to the reply messages has been received from the Home Agent in the virtual router group;
   when it is determined that an acknowledgement has not been received from the Home Agent in the virtual router group, retransmitting one or more of the reply messages to the Home Agent.

39. The method as recited in claim 37, further comprising: sending a reply message including one or more Home Agent identifiers identifying Home Agents in the virtual router group.

40. The method as recited in claim 35, further comprising: sending a reply message including one or more Home Agent identifiers identifying Home Agents in the virtual router group, the one or more Home Agent identifiers being obtained from a list maintained by the Home Agent.

41. The method as recited in claim 40, further comprising: determining whether an acknowledgement to the reply messages has been received from the Home Agent in the virtual router group;
   when it is determined that an acknowledgement has not been received from the Home Agent in the virtual router group, retransmitting the reply message to the Home Agent.

42. The method as recited in claim 35, further comprising: sending a binding table reply indicating that the mobility binding table maintained by the Home Agent is not initialized with bindings from other Home Agents in the virtual router group.

43. A computer-readable medium storing thereon computer-readable instructions executed by a computer for performing a method of maintaining Mobile IP operation in a Home Agent comprising:
   instructions for registering a Mobile Node with the Home Agent;
   instructions for creating a registration entry for the Mobile Node in a mobility binding table located at the Home Agent;
   instructions for sending a multicast message to a virtual router group to which the Home Agent belongs and with which the Home Agent shares a virtual IP address, the multicast message notifying the virtual router group of the registration;
   instructions for sending a multicast mobility binding table request to the virtual router group prior to registering a mobile node, the multicast mobility binding table request indicating that bindings present in a mobility binding table maintained by one or more members of the virtual router group are requested.

44. An apparatus for maintaining Mobile IP operation in a Home Agent, comprising:
   a processor; and
   a memory, at least one of the processor or the memory;
   registering a Mobile Node;
   creating a registration entry for the Mobile Node in a mobility binding table;
   sending a multicast message to a virtual router group to which the Home Agent belongs and with which the Home Agent shares a virtual IP address, the multicast message notifying the virtual router group of the registration;
   sending a multicast mobility binding table request to the virtual router group prior to registering a mobile node, the multicast mobility binding table request indicating that bindings present in a mobility binding table maintained by one or more members of the virtual router group are requested.

45. An apparatus for maintaining Mobile IP operation in a Home Agent, comprising:
   means for registering a Mobile Node;
   means for creating a registration entry for the Mobile Node in a mobility binding table;
   means for sending a multicast message to a virtual router group to which the Home Agent belongs and with which the Home Agent shares a virtual IP address, the multicast message notifying the virtual router group of the registration; and
   means for sending a multicast mobility binding table request to the virtual router group prior to registering a mobile node, the multicast mobility binding table request indicating that bindings present in a mobility binding table maintained by one or more members of the virtual router group are requested.

46. A computer-readable medium storing thereon computer-readable instructions executed by a computer for providing Mobile IP redundancy in a Home Agent, the Home Agent being a member of a redundancy group including one or more Home Agents, comprising:

instructions for sending a multicast mobility binding table request at the Home Agent to the redundancy group indicating that bindings present in a mobility binding table maintained by one or more members of the redundancy group are requested;

instructions for receiving one or more reply messages at the Home Agent including one or more bindings associated with one or more mobile nodes;

instructions for updating a mobility binding table maintained by the Home Agent with the bindings received in the reply messages; and instructions for updating the mobility binding table maintained by the Home Agent to include a binding associated with a mobile node that has registered with another Home Agent, the binding being received via a binding table update.

47. An apparatus for providing Mobile IP redundancy in a Home Agent, the Home Agent being a member of a redundancy group including one or more Home Agents, comprising:

a processor; and a memory, at least one of the processor the memory;

sending a multicast mobility binding table request to the redundancy group indicating that bindings present in a mobility binding table maintained by one or more members of the redundancy group are requested;

receiving one or more reply messages including one or more bindings associated with one or more mobile nodes;

updating a mobility binding table maintained by the Home Agent with the bindings received in the reply messages;

receiving a binding table update including a binding associated with a mobile node that has registered with another Home Agent; and updating the mobility binding table maintained by the Home Agent to include the binding.

48. An apparatus for providing Mobile IP redundancy in a Home Agent, the Home Agent being a member of a redundancy group including one or more Home Agents, comprising:

means for sending a multicast mobility binding table request to the redundancy group indicating that bindings present in a mobility binding table maintained by one or more members of the redundancy group are requested;

means for receiving one or more reply messages including one or more bindings associated with one or more mobile nodes;

means for updating a mobility binding table maintained by the Home Agent with the bindings received in the reply messages;

means for receiving a binding table update including a binding associated with a mobile node that has registered with another Home Agent; and means for updating the mobility binding table maintained by the Home Agent to include the binding.

49. The method as recited in claim 1, wherein the Home Agent is not active.

50. The method as recited in claim 3, wherein the Home Agent is in a standby, listening or learn state.

51. The method as recited in claim 8, wherein the Home Agent is in an active state.

52. The method as recited in claim 1, wherein the Home Agent is in a passive state.

53. The method as recited in claim 3, wherein registering a Mobile Node is performed in response to receiving a registration request from the Mobile Node.

\* \* \* \* \*